United States Patent

[11] 3,586,102

[72] Inventor Richard F. Gilles
Reseda, Calif.

[21] Appl. No. 799,642
[22] Filed Feb. 17, 1969
[45] Patented June 22, 1971

[73] Assignee Teledyne, Inc.
Los Angeles, Calif.

[54] HEAT SINK PILLOW
8 Claims, 2 Drawing Figs.

[52] U.S. Cl. .......... 165/186
[51] Int. Cl. .......... F28f 7/00
[50] Field of Search .......... 165/185, 186, 47, 80, 180

[56] References Cited

UNITED STATES PATENTS 3,301,315 1/1967 Webb .......... 165/185

*Primary Examiner*—Charles Sukalo
*Attorney*—Jackson & Jones

ABSTRACT: The invention disclosed herein describes a thermal pad having a pair of strips of film being adhered to each other with a quantity of thermal grease or the like being encapsulated therebetween. The thermal pad is adapted to be inserted between a heat-dissipating component and a heat-sinking component to provide a highly efficient thermal path between the two components.

INVENTOR.
RICHARD F. GILLES
BY
ATTORNEY

HEAT SINK PILLOW

BACKGROUND OF THE INVENTION

1. FIELD OF THE INVENTION

This invention relates to heat transfer devices and more particularly to thermal pads for insertion between a heat-dissipating component and a heat-sinking component.

2. DESCRIPTION OF THE PRIOR ART

In the electronic industry there are many components, especially microminiature circuits, that must have some means for carrying away the heat generated by the components to insure efficient and reliable operation. In many modular systems a plurality of circuits are mounted on a single board with each circuit having a heat-dissipating plate mounted thereon. The plates are usually mounted in the same plane with a heat-sinking component being mounted adjacent thereto. Generally, because of the tolerance buildup in the physical height of the circuits, the heat-sinking component, which is usually a flat member of heat-absorbing material, does not contact the heat-dissipating plates. As a result, heat transfer means are inserted between these plates and the heat-sinking component for contact therewith to provide a thermal path therebetween. Again, because of the interface tolerances, a solid heat transfer device is impractical.

Prior heat transfer means commonly used is thermal grease, a portion of which is inserted onto the heat-dissipating plate of each circuit. Thermal grease is a white substance of thick viscosity and is mixed with a filler material which is used to carry off the heat. The heat-sinking component is mounted adjacent thereto to come into contact with the thermal grease. Since the thermal grease is in a loose or uncontained state, each portion thereof spreads out between the two components as they are drawn together. The grease will not flow or run off because of its highly viscous state. As a result, as long as the portions of thermal grease are thick enough, contact between the two components over the entire interface is assured. Furthermore, the interface tolerances are obviated since each portion of grease acts independently to permit the heat-dissipating plates to be mounted at various distances from the heat-sinking component.

Although thermal grease can be used advantageously, there are certain problems encountered in its utilization. One problem that one encounters when using thermal grease is that, being highly viscous, it is very difficult and sticky to work with. This makes it difficult to apportion the proper amount of grease to each circuit plate. If too little is apportioned, contact between the two components is not assured, which is detrimental to the operation of the circuits. If there is minimal contact, this is still undesirable because the grease is not spread over the surface area of the components sufficiently to provide ample heat transfer area to carry off the desired amount of heat. If too much thermal grease is apportioned the portions of grease are spread over such a large area of the circuit plates by the heat-sinking component that the thermal grease is forced over the ends of the plates to come into direct contact with the circuit wiring and other components. When this occurs the circuits can not be repaired nor is it possible to clean the grease from the circuits. Quite often the soldered connections are damaged beyond repair by the grease. Unfortunately, even if only one circuit is damaged and cannot be repaired, the whole module must be replaced, which is undesirable and expensive.

Although thermal grease does allow for interface tolerances, problems still occur in connection with its use. Since each portion of grease acts independently, and depends only on the relative distance between the components, it is possible for each portion to be compressed at various amounts. As a result various sized heat transfer areas will exist. In this condition some thermal paths may be adequate while others may not. Consequently the various circuits in the module will be cooled at different rates. Since these interface tolerances cannot be measured adequately, it is not practical or possible to meter each portion of thermal grease to allow for the differences in interface distances. Therefore, while thermal grease has some advantages, many problems and shortcomings are still encountered in its utilization.

SUMMARY OF THE INVENTION

This invention obviates the above-mentioned shortcomings by providing a thermal pad that is adapted to be inserted between a heat-dissipating component and a heat-sinking component for engagement therewith to transfer the heat dissipated by the heat-dissipating component to said heat-sinking component. The thermal pad includes a pair of strips of film being adhered to each other with a quantity of thermal grease or the like being encapsulated therebetween.

An advantage of the thermal pad is that is provides a safeguard against having any thermal grease being forced off of the heat-dissipating component onto the electronic circuit, while still assuring contact between the heat-dissipating and the heat-sinking components.

Another advantage of the thermal pad is that it is able to be utilized in a module having a plurality of circuits to provide a highly efficient thermal path between the heat-dissipating components and the heat-sinking component when the interface between the components is difficult to achieve.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENT

Figure 1:
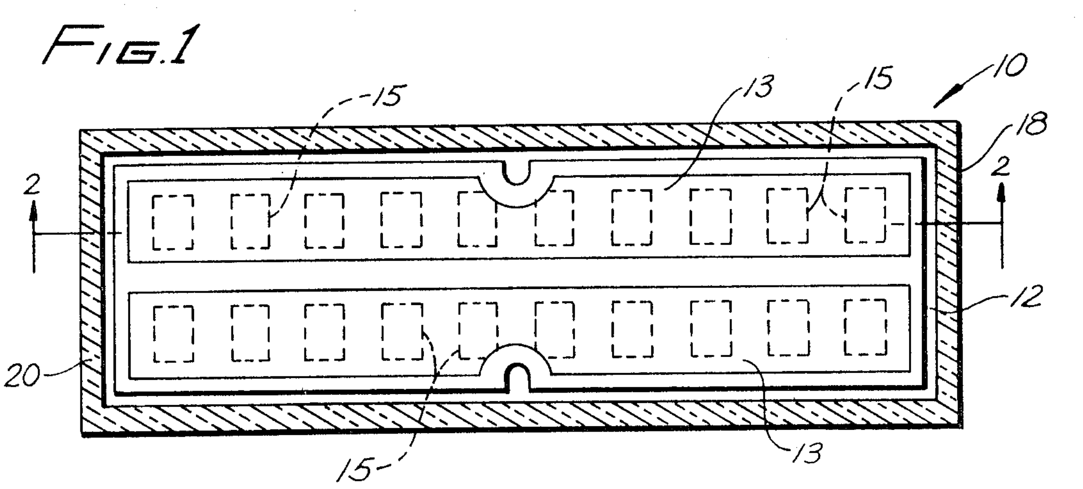
FIG. 1 shows a top plan view of a thermal pad in accordance with the present invention.
Figure 2:
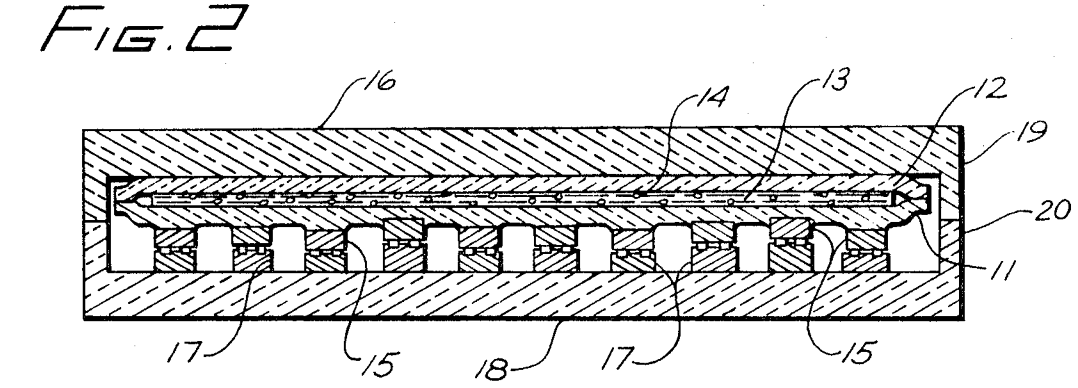
FIG. 2 is an exploded sectional view of the thermal pad taken along lines 2–2 of FIG. 1.

Referring now to the drawings, FIGS. 1 and 2 show a thermal pad, generally indicated by arrow 10, having a pair of elongated rectangular strips of film 11 and 12 being bonded to each other with a quantity of thermal grease 13 being encapsulated therebetween. Each of the strips of film 11 and 12 is composed of plastic material, such as Mylar, with each strip typically being 0.0005 inches thick. The quantity of thermal grease 13 is deposited in two parallel rows extending substantially along the entire length of the strips of film 11 and 12.

The thermal grease is composed of a highly viscous substance being mixed with a filler material 14 of high heat conductivity. The filler material 14 is dispersed throughout the entire length of the two rows of thermal grease and acts as the heat transfer substance within the mixture.

The thermal pad 10 is adapted to be inserted between heat-dissipating components 15 and a heat-sinking component 16, with the lower strip of film 11 contacting the heat-dissipating components 15 and the upper strip of film 12 contacting the heat-sinking component 16. The heat-dissipating components 15 are comprised of a plurality of plates, with each plate being mounted on an electronic circuit 17 for dispersing the heat generated therein. The electronic circuits 17 are mounted on a flat circuit board 18 in a pair of parallel rows that lie directly beneath the two rows of thermal grease 13.

The heat-sinking component 16 is comprised of a flat cover plate having outer edges 19 which are adapted to be attached to the outer edges 20 of the circuit board 18, thereby forming a module for use in an integrated circuit system.

In operation, the thermal pad 10 is in direct contact with the heat-dissipating components 15 and the heat-sinking component 16. Through conduction, the heat dissipated by the plates 15 is transferred through the thermal pad 10 to the heat-sinking component 16, thereby maintaining the electronic circuits 17 in the proper operating temperature and preventing them from overheating. It should be noted in FIG. 2 that there are differences in height, although exaggerated in the figure, among the respective electronic circuits and plate combinations. 6 However, the thermal pad 10 is of such a thickness that the two rows of thermal grease 13 are depressed at varying degrees along its length thereof to insure contact with each of the heat-dissipating plates 15.

Since the thermal pad 10 contacts the entire area of each of the heat-dissipating plates 15 the thermal path between the heat-dissipating and heat-sinking components is not dependent upon the gap between the two. This is particularly advantageous over the loose portions of thermal grease being on the plates since these portions seldom covered the entire plate area. As a result the thermal pad between the components is much larger and more efficient.

As can be seen, since the quantity of thermal grease 13 is encapsulated between the two strips of film 11 and 12, the thermal grease is not capable of running off the heat-dissipating plates 15 and contacting the electronic circuits 17 as is the case with the loose portions of grease.

Another advantage of the thermal pad is that it tends to dampen the resonant frequency of the module to enhance its operating characteristics.

As can be seen, the thermal pad 10 can be used between any two components where a thermal path between the two must be established, especially when the interface is difficult to achieve. Naturally, the length and width dimensions of the strips of film will vary and will depend upon the application requirements thereof, and the configuration of the encapsulated thermal grease will also vary, depending on the positioning of the heat-dissipating components.

What I claim is:

1. In combination with a heat-dissipating component, which dissipates heat from components mounted below, and a heat-sinking component which is adapted to carry off the heat in the heat-dissipating component, a thermal pad comprising:

a quantity of heat transfer substance of a maleable composition which would have a tendency to flow over the heat-dissipating component onto the components mounted below; and first and second strips of film being adhered at their edges to encapsulate said quantity of heat transfer substance therebetween, the encapsulated heat transfer substance disposed between and in contact with the heat-dissipating and heat-sinking components to form a thermal path therethrough whereby the heat transfer substance is prevented from flowing over the heat-dissipating component onto the component mounted below.

2. The invention in accordance with claim 1 wherein said first and second strips of film are composed of a plastic material.

3. The invention in accordance with claim 1 wherein said heat transfer substance is composed of thermal grease.

4. The invention in accordance with claim 3 wherein said thermal grease is composed of a viscous substance being mixed with a filler material of high heat conductivity.

5. In combination:

a plurality of electronic circuits being mounted on a module, each of said circuits having a heat-dissipating component mounted thereon to dissipate the heat generated within said circuit, said heat-dissipating components lying substantially on the same plane;

a heat-sinking component positioned contiguous to said heat-dissipating components; and a thermal pad having a pair of strips of film being adhered to each other with a quantity of heat transfer substance encapsulated therebetween, said heat transfer substance being of a maleable composition which would have a tendency to flow over the heat-dissipating component onto the electronic circuits mounted below, said thermal pad disposed between and in contact with said heat-dissipating components and said heat-sinking components for engagement therewith to form a thermal path therethrough whereby the heat transfer substance is prevented from flowing over the heat-dissipating component onto the components mounted below.

6. The invention in accordance with claim 5 wherein said first and second strips of film are composed of a plastic material.

7. The invention in accordance with claim 5 wherein said heat transfer substance is composed of thermal grease.

8. The invention in accordance with claim 7 wherein said thermal grease is composed of a viscous substance being mixed with a filler material of high heat conductivity.